(12) United States Patent
Jung

(10) Patent No.: US 8,273,473 B2
(45) Date of Patent: Sep. 25, 2012

(54) SECONDARY BATTERY HAVING SAFETY VENT

(75) Inventor: Sangsok Jung, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 503 days.

(21) Appl. No.: 12/000,679

(22) Filed: Dec. 14, 2007

(65) Prior Publication Data

US 2008/0145748 A1  Jun. 19, 2008

(30) Foreign Application Priority Data

Dec. 14, 2006  (KR) .................. 10-2006-0128248

(51) Int. Cl.
*H01M 2/12* (2006.01)
(52) U.S. Cl. .............. 429/56; 429/57; 429/82; 429/162; 429/175
(58) Field of Classification Search .......... 429/122–347, 429/56, 57, 82; 29/623.1–623.5
See application file for complete search history.

(56) References Cited

U.S. PATENT DOCUMENTS

| | | | |
|---|---|---|---|
| 6,423,440 B1 | 7/2002 | Takada et al. | |
| 2003/0131880 A1* | 7/2003 | Marubayashi et al. | .... 137/68.27 |
| 2005/0112455 A1* | 5/2005 | Marubayashi et al. | ......... 429/56 |
| 2005/0214641 A1 | 9/2005 | Kim | |
| 2006/0292437 A1* | 12/2006 | Matsumoto et al. | ............ 429/56 |
| 2007/0275294 A1 | 11/2007 | Stearns et al. | |

FOREIGN PATENT DOCUMENTS

| | | |
|---|---|---|
| EP | 0008541 A2 | 8/1979 |
| JP | 09-245839 | 9/1997 |
| JP | 10162798 | 6/1998 |
| JP | 10-284035 | 10/1998 |
| JP | 11-213978 | 8/1999 |
| KR | 2006-0055400 | 5/2006 |

OTHER PUBLICATIONS

Merriam-Webster's Collegiate Dictionary, Eleventh Edition, Jul. 2003, p. 307.*

* cited by examiner

*Primary Examiner* — Basia Ridley
*Assistant Examiner* — Jonathan G Leong
(74) *Attorney, Agent, or Firm* — Robert E. Bushnell, Esq.

(57) ABSTRACT

A secondary battery has a safety vent, and the safety vent has an asymmetric structure and provides a substantial opening for the battery, instead of having a local crack, to rapidly vent to atmosphere in order to prevent the secondary battery from bursting when the internal pressure of a battery increases excessively or external impact is applied thereto. The secondary battery includes an electrode assembly charging/discharging functions, a can housing the electrode assembly, a cap assembly that includes a cap plate closing up an open part of the can, and a safety vent having an asymmetric track shape that is provided in the cap plate of the cap assembly.

16 Claims, 3 Drawing Sheets

SECONDARY BATTERY HAVING SAFETY VENT

CLAIM OF PRIORITY

This application makes reference to, incorporates the same herein, and claims all benefits accruing under 35 U.S.C. §119 from an application for SECONDARY BATTERY earlier filed in the Korean Intellectual Property Office on 14 Dec. 2006 and there duly assigned Serial No. 10-2006-0128248.

BACKGROUND OF THE INVENTION

1. Field of the Invention

The present invention relates to a secondary battery, and more particularly, to a safety vent which has an asymmetric structure able to accommodate minor deformation and that is not susceptible to local cracking, but which will quickly separate from the structure encasing the battery and provide a substantial opening for the battery to rapid vent to atmosphere in order to prevent the secondary battery from bursting when the internal pressure of a battery increases excessively or external impact is applied thereto.

2. Description of Related Art

In general, secondary batteries are rechargeable batteries having a small size and high capacity. In recent years, the secondary batteries, for example, nickel-metal hydride (Ni-MH) batteries and lithium batteries have come into widespread use.

The secondary batteries are the main parts used for various portable electronic apparatuses, such as cellular phones, notebook computers, and PDAs. The market of small secondary batteries has been gradually expanded with the improvements of performances of portable electronic apparatuses and proliferation of portable electronic apparatuses.

Particularly, in lithium secondary batteries, a lithium-based oxide is used as a positive electrode active material, and a carbon material is used as a negative electrode active material. The lithium secondary batteries are classified into liquid electrolyte batteries and polymer electrolyte batteries according to the type of electrolyte. That is, batteries using liquid electrolytes are called lithium ion (Li-ion) batteries, and batteries using polymer electrolytes are called lithium polymer batteries. In addition, the lithium secondary batteries are manufactured in various shapes, such as a cylindrical shape, a square shape, and a pouch shape.

Among the lithium secondary batteries, in the case of the lithium ion battery, when the lithium ion battery is overcharged, the resolution of the electrolyte occurs in the positive electrode, and lithium metal is extracted from the negative electrode, and these phenomena may cause the characteristics of the battery to deteriorate or the battery to be fired or to generate heat. In the case of the lithium polymer battery, when the lithium polymer battery is locally overheated during charging or discharging, the polymer electrolyte having low heat resistance is partially resolved or softened, and this phenomenon causes a current or potential to be non-uniform and results in a short circuit. As a result, the battery may be burst or exploded. In addition, the internal pressure of the battery increases when gas is generated during an electrical/chemical reaction in the battery, thus the battery is expanded and the expansion may cause the explosion of the battery. These phenomena are fatal to the security of the battery.

Therefore, in order to solve these problems, various techniques for ensuring the safety of the battery have been proposed. For example, a battery having a safety vent for discharging gas generated in the battery to the exterior at a pressure higher than a predetermined value has been proposed. In general, the safety vent is manufactured by forming a groove in a portion of a cap plate of a secondary battery or in a portion of a can with a constant thickness by using a mechanical method, an etching method, or an electroforming method. The groove formed in a portion of the cap plate or the can is generally a notch.

A hot plate test is performed as one of the safety tests for a secondary battery having the safety vent. In the hot plate test, a manufactured secondary battery (generally, a bare cell) is placed on the plate heated at a temperature of 200° C. to 250° C. to test the resistance of the battery against high temperature.

Further, a drop test is performed as another test to the safety of the secondary battery, and the drop test is an endurance test for external impact. In the drop test, for example, a secondary battery is put into a pipe having a height of 1 m and the pipe is rotated for a predetermined amount of time.

In the safety vent according to the related art, the notch, which is a burst portion, is symmetric with respect to a virtual center-line thereof. Different pressures may be applied to portions of the notch. For example, when the notch is formed in the cap plate, different pressures may be applied to a portion of the notch close to an electrode terminal provided at the center of the cap plate and another portion of the notch away from the electrode terminal. Therefore, when the internal pressure of the secondary battery increases due to a short circuit in the secondary battery or the overcharge thereof, in many cases, a local crack, occurs at the notch of the safety vent. The local crack occurring in the safety vent causes an abnormal state of the battery. As a result, the safety vent is not completely exploded at an internal pressure higher than a predetermined value and thus does not reduce the increased internal pressure of the battery. As such, when the safety vent abnormally operates, i.e., does not completely explodes, the internal pressure of the battery continuously increases and results in the explosion of the battery.

Further, when external impact is applied to the battery due to the drop of the battery, a greater impact may be applied to both sides of the cross section of the battery than to the center of the cross section of the battery. As described above, in the related art, since the safety vent is symmetric with respect to the virtual center line thereof, a greater impact is applied to portions of the safety vent close to both sides of the battery, which may cause defects of a complete burst, such as a local crack.

Furthermore, when heat is applied to the battery from outside, for example, in the structure in which a safety vent is formed in the cap plate of the battery, the cap plate is heated from a circumferential portion to a central portion. In the safety vent according to the related art that is symmetric with respect to the virtual center line, a portion of the safety vent adjacent to the edge of the cap plate takes up a considerable area of the overall area of the safety vent, and defects of a complete burst, such as a local crack, is more likely to occur in a portion of the safety vent close to the edge of the cap plate.

SUMMARY OF THE INVENTION

It is, therefore, an object of the present invention to provide an improved secondary battery to solve the drawbacks described above.

It is another object of the present invention to provide a secondary battery having a safety vent which has an asymmetric structure and does not locally crack, to prevent the secondary battery from burst when the internal pressure of a battery increases excessively or external impact is applied thereto.

Accordingly, the present invention has been contrived to solve the above-described drawbacks, and an aspect of the present invention is to provide a secondary battery having a safety vent which is asymmetric with respect to a center line thereof, which may prevent pressure applied to the outside of the battery from being non-uniformly applied to the safety vent, rapidly burst the entire safety vent without a defect in burst, such as a local crack, reduce the internal pressure of the battery, and easily discharge an electrolyte.

Another aspect of the invention is to provide a secondary battery that includes a safety vent which is formed in a cap plate in an asymmetric track shape with respect to a center line thereof, which may reduce a defect in burst, such as a local crack, to a minimum when high-temperature heat is applied to the secondary battery or a greater external impact is applied to a portion of the safety vent close to the edge of the cap plate.

In order to accomplish the aspect of the present invention, according to an aspect of the invention, a secondary battery includes an electrode assembly performing charging/discharging functions, a can housing the electrode assembly, a cap assembly that includes a cap plate closing up an open side of the can, and a safety vent having an asymmetric track shape that is provided in the cap plate of the cap assembly.

Preferably, the safety vent having the asymmetric track shape includes a first arc portion, a second arc portion that is separated from the first arc portion and has a curvature smaller than that of the first arc portion, and a pair of coupling portions connecting the first arc portion and the second arc portion. The cap plate may have a pair of long sides facing each other and a pair of short sides facing each other, and the distance between the first arc portion and one short side adjacent to the safety vent may be larger than the distance between the second arc portion and the one short side. An electrode terminal may be provided in the center of the cap plate, and the distance between the electrode terminal and the first arc portion may be smaller than the distance between the electrode terminal and the second arc portion.

The first and second arc portions and the coupling portions may be all formed in notched shapes.

A step portion having a smaller thickness than that of the cap plate may be formed around the notches forming the safety vent.

An electrode terminal may be provided in the center of the cap plate. When a virtual center line is drawn between the electrode terminal and one short side of the cap plate, the safety vent having the asymmetric track shape may lean toward the one short side of the cap plate from the virtual center line.

The thickness of the safety vent having the asymmetric track shape may be in the range of 24 μm to 30 μm. In addition, the safety vent may have a rupture pressure of 22±3 kgf/cm$^2$.

The length of the safety vent in the lateral direction of the cap plate may be in the range of 4.8 mm to 5.2 mm, and the length of the safety vent in the longitudinal direction of the cap plate may be in the range of 2.8 mm to 3.2 mm.

According to the above-mentioned structure in which the safety vent has an asymmetric track shape, when the internal pressure of the secondary battery becomes higher than a predetermined value due to a short circuit or overcharge, it is possible to prevent pressure applied to the outside of the battery from being non-uniformly applied to the safety vent, to rapidly burst the entire safety vent without a defect in burst, such as a local crack, to reduce the internal pressure of the battery, and to easily discharge an electrolyte. The safety vent having an asymmetric structure is able to accommodate minor deformation and is not susceptible to local cracking, but quickly separates from the structure encasing the secondary battery and provides a substantial opening for the battery to rapid vent to atmosphere in order to prevent the secondary battery from bursting when the internal pressure of a battery increases excessively or external impact is applied thereto.

Further, according to the safety vent having an asymmetric track shape, when high-temperature heat or impact is applied to the secondary battery from the outside, the impact or heat transmitted to a portion of the safety vent close to the cap plate is reduced, which makes it possible to reduce a defect in burst, such as a local crack, to a minimum.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the invention will be described in detail with reference to the accompanying drawings.

Figure 1:
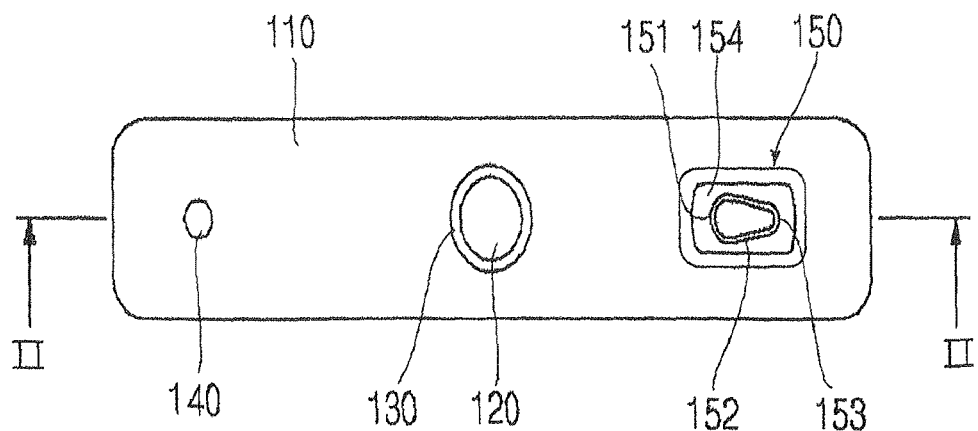
FIG. 1 is a plan view illustrating a cap plate having a safety vent according to a first embodiment of the invention provided therein.
Figure 2:
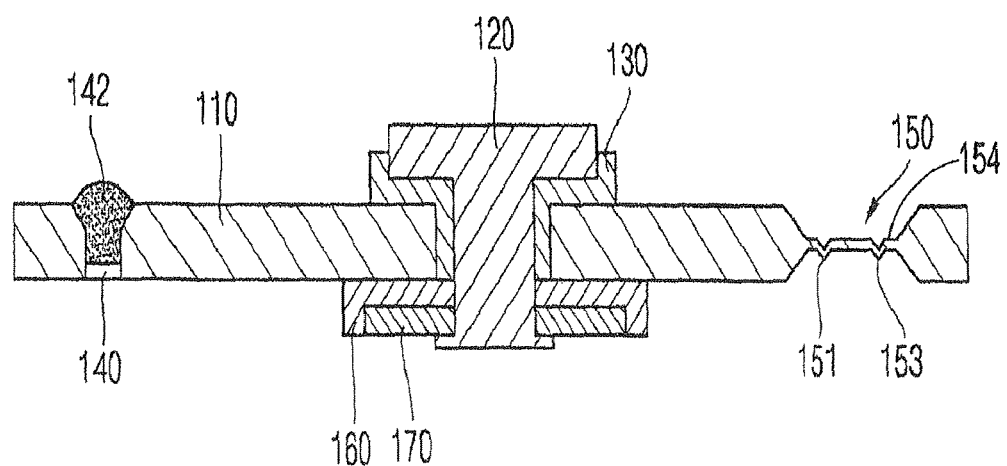
FIG. 2 is a cross-sectional view of the cap plate illustrated in FIG. 1 cut out along line
Figure 3:
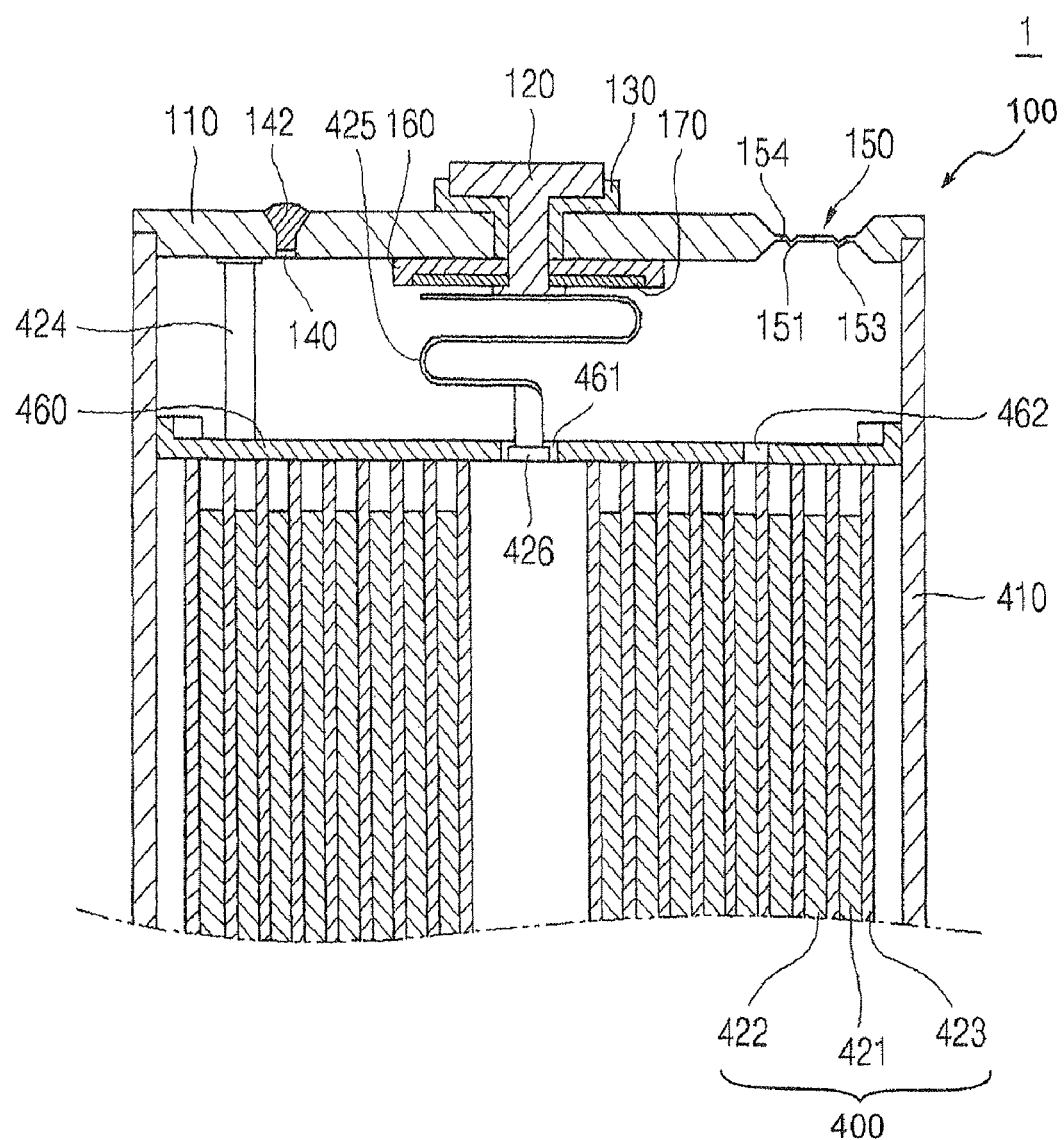
FIG. 3 is a cross-sectional view illustrating the overall structure of a secondary battery including the cap plate and the safety vent according to the first embodiment of the invention illustrated in FIG. 1.

FIG. 1 is a plan view illustrating a cap plate having a safety vent according to a first embodiment of the invention provided therein, FIG. 2 is a cross-sectional view of the cap plate illustrated in FIG. 1 cut out long line II-II, and FIG. 3 is a cross-sectional view illustrating the overall structure of a secondary battery including the cap plate and the safety vent according to the first embodiment of the invention.

As illustrated in FIG. 3, a secondary battery 1 according to the first embodiment of the invention includes an electrode assembly 400, a can 410, a cap assembly 100 having a cap plate 110, and a safety vent 150.

Electrode assembly 400 is formed of a so-called jelly roll type in which a laminated structure of a wide positive electrode plate 421, a wide negative electrode plate 422, and a separator 423 interposed therebetween is spirally wound. A positive electrode tap 424 is electrically connected to a positive electrode collector region of positive electrode plate 421 of electrode assembly 400 in which a positive electrode coating portion is not formed, and a negative electrode tap 425 is electrically connected to a negative electrode collector region of negative electrode plate 422 in which a negative electrode coating portion is not formed.

In this case, the polarities of positive electrode plate 421 and negative electrode plate 422 may be changed, and the polarities of positive electrode tap 424 and negative electrode tap 425 may also be changed. An insulating tape 426 is wound at both the boundary between positive electrode tap 424 and the electrode assembly and the boundary between negative electrode tap 425 and electrode assembly 400 in order to prevent a short circuit between the positive electrode and negative electrode taps and the electrode assembly.

Can 410 has one side open through which the electrode assembly is inserted. Can 410 is preferably formed of, for example, aluminum or aluminum alloy.

Cap assembly 100 has cap plate 110 having size and shape corresponding to an upper open part of can 410. Cap plate 110 is preferably formed of, for example, aluminum or aluminum alloy in order to improve weldability to can 410. A through hole is formed in the center of cap plate 110 so that an electrode terminal 120 can pass through the through hole. An insulating gasket 130 in a tube shape is provided outside electrode terminal 120 passing through the center of cap plate 110 to electrically insulate electrode terminal 120 from cap plate 110.

Then, electrode assembly 400 is housed by can 410, and the opened one side of can 410 having electrode assembly 400 provided therein is sealed with cap assembly, thereby forming a bare cell, which is a basic component of a secondary battery. Subsequently, safety vent 150 is provided to discharge a high-temperature gas generated from the inside of the bare cell and to reduce the internal pressure increased due to the overcharge or overdischarge of the bare cell.

Safety vent 150 is formed in cap plate 110 of cap assembly 100, and safety vent 150 according to the first embodiment will be described with reference to FIGS. 1 and 2.

As illustrated in FIG. 1, safety vent 150 constructed according to the first embodiment of the invention is formed in cap plate 110 of the cap assembly in an asymmetric track shape. When the internal pressure of the bare cell becomes higher than a predetermined value due to a short circuit, or the overcharge or overdischarge of the bare cell, the asymmetric track shape of safety vent 150 can prevent non-uniform pressure from being applied to safety vent 150. That is, the asymmetric track shape can prevent a local crack of safety vent 150 due to the non-uniform pressure applied to safety vent 150. Therefore, safety vent 150 having an asymmetric structure is able to accommodate minor deformation and is not susceptible to local cracking, but quickly separates from the structure encasing the secondary battery and provides a substantial opening for the battery to rapid vent to atmosphere in order to prevent the secondary battery from bursting when the internal pressure of a battery increases excessively or external impact is applied thereto.

As a result, since the local crack, of the safety vent is prevented, it is possible to prevent the safety vent from being abnormally operated due to abnormal internal pressure conditions of the battery caused by the local crack, and thus prevent the explosion of the battery due to an increase of the internal pressure in the battery. The goal of the improved safety vent is to improve the safety of the whole secondary battery.

Safety vent 150 includes first and second arc portions 151 and 153 that have different curvatures and are formed at a predetermined interval and a pair of coupling portions 152 connecting first and second arc portions 151 and 153. In this embodiment, cap plate 110 has a pair of short sides facing each other and a pair of long sides facing each other. In this case, the distance between first arc portion 151 and one short side of cap plate 110 adjacent to second arc portion 153 may be larger than the distance between second arc portion 153 and the one short side of cap plate 110. More specifically, for example, electrode terminal 120 is provided in the center of cap plate 110 so as to be insulated from cap plate 110 by insulating gasket 130, and the distance between first arc portion 151 and electrode terminal 120 is smaller than the distance between second arc portion 153 and electrode terminal 120.

When secondary battery 1 falls on the ground, a stronger external impact is generally applied to the outer surface of cap plate 110 of the bare cell, particularly, the circumferences of both edges of the cap plate than to the inner surface of cap plate 110. Therefore, second arc portion 153 of safety vent 150 that has a small curvature and is displaced adjacent to the edge of cap plate 110 is little affected by the external impact applied to both edges of the cap plate, which makes it possible to prevent a local crack, of safety vent 150 due to external impact.

Further, when high-temperature heat is applied to the secondary battery, first, an outer part of the cap plate is heated and then the heat is transmitted to a central portion thereof. In this case, in the safety vent having the asymmetric track shape, a portion adjacent to the edge of the cap plate is smaller than that of a safety vent having a symmetric track shape according to the related art. Therefore, this structure makes it possible to prevent thermal expansion of the safety vent due to high-temperature heat applied from the outside and thus to prevent a local crack of the safety vent. The burst will be affected by two main components, i.e. curvature and a length of notch portion. Especially, the notch, which is made so as to be fragile, is a more important component leading to the burst event. Therefore, considering of two components, the longer the notch portion is, the easier it is to be burst, regardless of its curvature. Namely, the small curvature with a shorter notch portion is harder to be burst comparing with the big one, resulted in preventing a local burst of the safety vent.

In safety vent 150 according to the first embodiment, first arch portion 151, second arc portion 153, and coupling portions 152 are formed in notched shapes in the outer surface of cap plate 110, but the invention is not limited thereto. On the contrary, the first and second arc portions and the coupling portions may be formed in the inner surface of the cap plate. Inner surface of the cap plate refers to the surface facing to the bare cell, and outer surface refers to the surface facing to the exterior of the battery.

Preferably, a step portion 154 having the recess shape is formed around safety vent 150. In this case, step portion 154 is formed with a smaller thickness than that of the cap plate. In this way, when internal pressure higher than a predetermined value is applied to safety vent 150 of the secondary battery, the internal pressure of the secondary battery concentrates on step portion 154, which is a recessed portion, having a small thickness and a weak strength. In addition, since safety vent 150 in a notched shape is provided in step portion 154, safety vent 150 can be easily burst. In other words, first arch portion 151, second arc portion 153, and coupling portions 152 of safety vent 150 separate from the battery when internal pressure of a battery increases excessively or external impact is applied thereto.

Safety vent 150 may be provided at a position opposite to an electrolyte injection hole 140 with electrode terminal 120 coupled to cap plate 110 so as to be insulated therefrom interposed therebetween. In this case, when a virtual center line is drawn between the electrode terminal and one short side of cap plate 110, safety vent 150 is preferably formed so as to lean toward the one short side of the cap plate from the virtual center line, and second arc portion 153 having a small curvature is formed closer to the one short side of the bare cell. In general, when the bare cell or the secondary battery of a pack type falls on the ground and external impact is applied to safety vent 150, a relatively strong external impact is applied to the circumference of the cap plate, particularly, the edge of the cap plate. Therefore, the reason that second arc portion 153 having a small curvature is provided adjacent to the edge of the cap plate is to reduce a local burst of safety vent 150 to the minimum, which has been described above.

The inventor manufactured a second battery in which the safety vent having an asymmetric track shape is formed in the cap plate, and performed a hot plate test on the secondary battery at a temperature of 250° C.

Hereinafter, experimental examples of the invention will be described below, but the invention is not limited to the following experimental examples. In the following description, "Step L0" means that no defect occurs in the secondary battery during experiments, "Step L1" means that liquid leaks through the safety vent, "Step L2" means that a flash occurs in the secondary battery, "Step L3" means that smoke is generated from the secondary battery, "Step L4" means that the secondary battery is fired, and "Step L5" means that the secondary battery is burst. Step L1~L5 refer to the conditions of the whole secondary battery. The number of steps increases, the severer the condition of battery becomes. A cap assembly 100 comprises electrode terminal 120, gasket 130, insulating plate 160 and terminal plate 170. The differences between the symmetric safety vents and the asymmetric safety vents in the hot plate test and the drop test are: second arc of the asymmetric safety vent has smaller curvature and asymmetric safety vent has a notched shape.

EXPERIMENTAL EXAMPLE 1

An asymmetric-track-shape safety vent having a thickness of 24 μm and a rupture pressure of 22±3 kgf/cm$^2$ is formed in the cap plate. The length of the safety vent in the lateral direction of the cap plate is in the range of 4.8 mm to 5.2 mm, and the length of the safety vent in the longitudinal direction of the cap plate is in the range of 2.8 mm to 3.2 mm. The lateral direction corresponds to the long side of the cap plate and the longitudinal direction corresponds to the small side of the cap plate. Then, a hot plate test is performed at a temperature of 250° on five bare cells having these asymmetric safety vents and secondary batteries having symmetric safety vents according to the related art. As a result, all the secondary batteries having the symmetric safety vents according to the related art reach Step L5 (burst), while all the asymmetric-track-type safety vents of the five bare cells according to the invention are normally operated and do not reach Step L5 (burst). Among the safety vents of the five bare cells, one safety vent reaches Step L1 (leakage), and four safety vents reach Step L4 (fire).

EXPERIMENTAL EXAMPLE 2

An asymmetric-track-shape safety vent having a thickness of 27 μm and a rupture pressure of 22±3 kgf/cm$^2$ is formed in the cap plate. The length of the safety vent in the lateral direction of the cap plate is in the range of 4.8 mm to 5.2 mm, and the length of the safety vent in the longitudinal direction of the cap plate is in the range of 2.8 mm to 3.2 mm. The length of the safety vent in the longitudinal direction of the cap plate refers to the maximum length of the safety vent in the longitudinal direction of the cap plate and refers to the maximum length of the safety vent in the direction perpendicular to the lateral direction. Then, a hot plate test is performed at a temperature of 250° on ten bare cells having these safety vents and secondary batteries having symmetric safety vents according to the related art. As a result, similar to the experimental example 1, all the secondary batteries having the symmetric safety vents according to the related art reach Step L5 (burst), while all the asymmetric-track-type safety vents of the ten bare cells according to the invention are normally operated and do not reach Step L5 (burst). Among the safety vents of the ten bare cells, two safety vents reach Step L1 (leakage), five safety vents reach Step L3 (flash), and three safety vents reach Step L4 (fire).

EXPERIMENTAL EXAMPLE 3

An asymmetric-track-shape safety vent having a thickness of 30 μm and a rupture pressure of 22±3 kgf/cm$^2$ is formed in the cap plate. The length of the safety vent in the lateral direction of the cap plate is in the range of 4.8 mm to 5.2 mm, and the length of the safety vent in the longitudinal direction of the cap plate is in the range of 2.8 mm to 3.2 mm. The length of the safety vent in the longitudinal direction of the cap plate refers to the maximum length of the safety vent in the longitudinal direction of the cap plate and refers to the maximum length of the safety vent in the direction perpendicular to the lateral direction. Then, a hot plate test is performed at a temperature of 250° on five bare cells having these safety vents and secondary batteries having symmetric safety vents according to the related art. As a result, similar to the experimental examples 1 and 2, all the secondary batteries having the symmetric safety vents according to the related art reach Step L5 (burst), while all the asymmetric-track-shape safety vents of the five bare cells according to the invention are normally operated and do not reach Step L5 (burst). Among the safety vents of the five bare cells, two safety vents reach Step L2 (flash), and three safety vents reach Step L4 (fire).

Further, an asymmetric-track-shape safety vent having a thickness of 24 μm to 30 μm and a rupture pressure of 22±3 kgf/cm$^2$ is formed in the cap plate. The length of the safety vent in the lateral direction of the cap plate is in the range of 4.8 mm to 5.2 mm, and the length of the safety vent in the longitudinal direction of the cap plate is in the range of 2.8 mm to 3.2 mm. The length of the safety vent in the longitudinal direction of the cap plate refers to the maximum length of the safety vent in the longitudinal direction of the cap plate and refers to the maximum length of the safety vent in the direction perpendicular to the lateral direction. Then, the inventor performs a drop test on a bare cell including the cap plate having the safety vent provided therein, in which the bare cell rotates in a rotating pipe having a height of 1 m.

As the result of the drop test, all the bare cells having the symmetric safety vents according to the related art do not pass the drop test, but all the bare cells having the asymmetric-track-type safety vents according to the invention pass the drop test.

Figure 4:
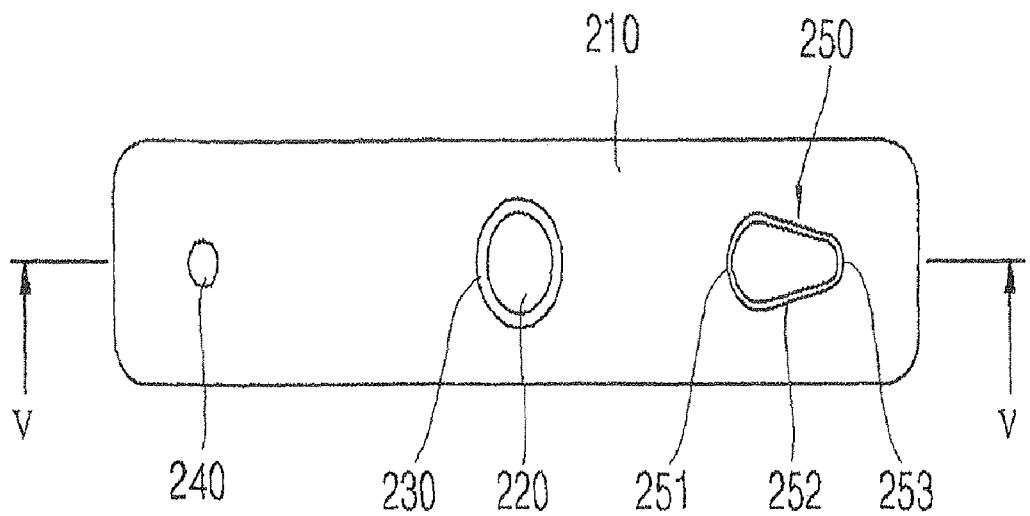
FIG. 4 is a plan view illustrating a cap plate having a safety vent according to a second embodiment of the invention provided therein.
Figure 5:
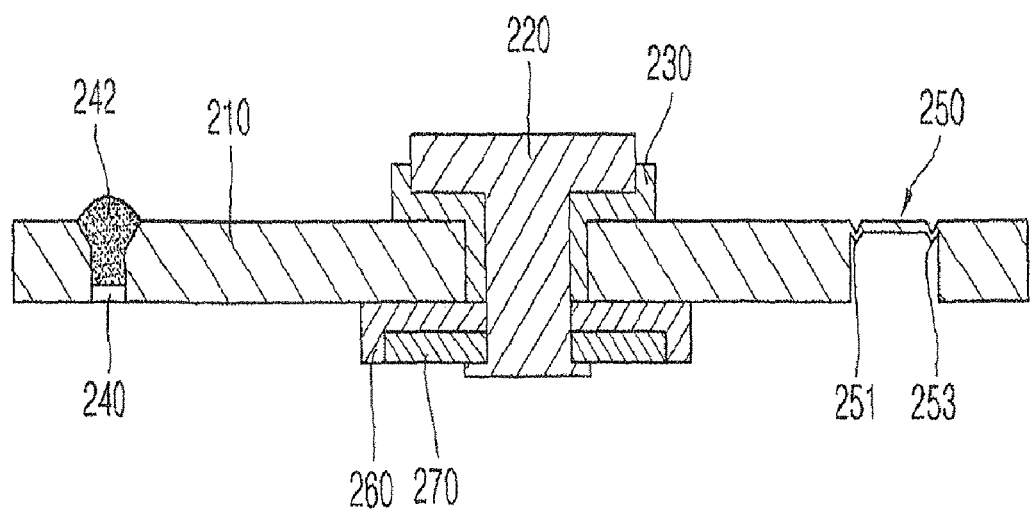
FIG. 5 is a cross-sectional view of the cap plate illustrated in FIG. 4 cut out along line V-V.

Meanwhile, FIG. 4 is a plan view illustrating a cap plate having a safety vent according to a second embodiment of the invention provided therein, and FIG. 5 is a cross-sectional view of the cap plate illustrated in FIG. 4. In this embodiment, a safety vent 250 is similar to the safety vent according to the first embodiment illustrated in FIGS. 1 to 3 in that the safety vent 250 is formed in an asymmetric track shape, but safety vent 250 is different from safety vent 150 illustrated in FIGS. 1 to 3 in that a step portion is not formed around safety vent 250. The reference number 210 refers to the cap plate, the reference number 220 refers to an electrode terminal, the reference number 230 refers to an insulating gasket, the reference number 240 refers to an electrolyte injection hole, the reference number 242 refers to a stopper, the reference number 260 refers to a insulating plate, and the reference number 270 refers to a terminal plate.

Therefore, the constitution and operation of the safety vent according to the second embodiment illustrated in FIGS. 4 and 5 are similar to those of the safety vent according to the first embodiment illustrated in FIGS. 1 to 3, and thus a detailed description thereof will be omitted. Briefly, safety vent 250 according to the second embodiment includes first and second arc portions 251 and 253 that have different curvatures and are formed at a predetermined interval, and a pair of coupling portions 252 connecting first and second arc portions 251 and 253. In the cap plate illustrated in FIGS. 4 and 5, the same components as those in the cap plate illustrated in FIGS. 1 to 3 have the same functions, but are denoted by different reference numerals.

The structure of the secondary battery according to the first embodiment of the invention will be described in more detail below with reference to FIG. 3. An insulating plate 160 is provided in the center of the lower surface of cap plate 110, that is, in the vicinity of the through hole, and a terminal plate 170 is provided on the lower surface of insulating plate 160.

Positive electrode tap 424 is electrically connected to cap plate 110 by, for example, welding, and negative electrode tap 425 bent in zigzag is electrically connected to electrode terminal 120 insulated from cap plate 110 by insulating gasket 130 by, for example, welding. Positive electrode tap 424 and negative electrode tap 425 are electrically connected to a PTC (positive temperature coefficient) element and a protective circuit unit according to their polarities, respectively.

An insulating case 460 is provided on the upper surface of the electrode assembly to electrically insulate electrode assembly 400 from cap assembly 100 and to cover an upper part of the electrode assembly. A tap hole 461 is formed in insulating case 460 such that negative electrode tap 425 can passes through tap hole 461, and a through hole 462 for an electrolyte is formed in a portion of insulating case 460 close to one side.

An electrolyte injection hole 140 is formed in a portion of cap plate 110 close to one side, and a stopper 142 plugs up electrolyte injection hole 140 after the electrolyte is injected.

As can be seen from the above-described embodiments, according to the secondary battery according to the invention, when the internal pressure of the secondary battery becomes higher than a predetermined value due to a short circuit, or the overcharge or overdischarge of the secondary battery, a local crack, does not occur in the safety vent, but the entire safety vent is normally burst. As a result, the high internal pressure of the secondary battery is rapidly reduced through the safety vent, which makes it possible to prevent the secondary battery from being exploded due to the abnormal operation of the safety vent caused by defects in a complete burst, such as a local crack, and thus to improve the structural safety of the secondary battery.

Further, according to the secondary battery according to the invention, the safety vent is sufficiently burst without generating a defect in burst, such as a local crack, when the internal pressure of the battery becomes higher than a predetermined value, and the defect in burst, such as a local crack, does not easily occur due to external impact. Therefore, the whole quantity of electrolyte contained in the secondary battery is rapidly discharged to the outside through the safety vent that is completely burst when the internal pressure of the secondary battery increases, and the electrolyte is prevented from leaking out due to external impact. As a result, it is possible to prevent the secondary battery from being exploded or burst due to the high-temperature reaction of the electrolyte leaking from a local crack of the safety vent to the periphery of the secondary battery and thus improve the safety of the secondary battery.

Furthermore, according to the above-described embodiments, when high-temperature heat is applied to the secondary battery from the outside, the thermal expansion of the safety vent formed in the cap plate is delayed or reduced, which makes it possible to reduce a local burst of the safety vent due to heat applied from the outside to the minimum and improve the safety of the secondary battery.

Moreover, according to the above-described embodiments, when an external impact is applied to the secondary battery, the external impact transmitted to the safety vent formed in the cap plate is reduced, which makes it possible to reduce a local burst of the safety vent due to external impact to the minimum and improve the safety of the secondary battery.

What is claimed is:

1. A secondary battery, comprising:
an electrode assembly performing charging and discharging functions;
a can housing the electrode assembly;
a cap assembly which includes a cap plate closing up an open side of the can; and
a safety vent having an indented track shape recessed into the cap plate of the cap assembly, the indented track shape having spaced-apart coupling portions asymmetrically oriented about a center line of the track that traverses a shorter width of the cap plate to join together a first arc portion symmetrically aligned at diametrically opposite ends of the track shape with a second arc portion which has a different curvature compared to that of the first arc portion, an entirety of an inner portion defined by the indented track shape being configured to be flat.

2. The secondary battery of claim 1, wherein
the second arc portion has a smaller curvature compared to that of the first arc portion.

3. The secondary battery of claim 2, wherein the cap plate has a pair of long sides facing each other and a pair of short sides facing each other, and the distance between the first arc portion and one short side of the cap plate adjacent to the safety vent is larger than the distance between the second arc portion and the one short side of the cap plate.

4. The secondary battery of claim 2, wherein an electrode terminal is provided at the center of the cap plate, and the distance between the electrode terminal and the first arc portion is smaller than the distance between the electrode terminal and the second arc portion.

5. The secondary battery of claim 2, with the first and second arc portions and the coupling portions being formed in notched shapes.

6. The secondary battery of claim 5, wherein a step portion having a smaller thickness than that of the cap plate is formed around the notches.

7. The secondary battery of claim 2, with the thickness of the safety vent being in the range of 24 μm to 30 μm.

8. The secondary battery of claim 2, with the safety vent has a predetermined rupture pressure of 22±3 kgf/cm².

9. The secondary battery of claim 3, wherein the length of the safety vent in the lateral direction of the cap plate is in the range of 4.8 mm to 5.2 mm, and the maximum length of the safety vent in the longitudinal direction of the cap plate is in the range of 2.8 mm to 3.2 mm.

10. The secondary battery as claimed in claim 1, wherein an electrode terminal is provided in the center of the cap plate, when a virtual center line is drawn between the electrode terminal and one short side of the cap plate and the virtual center line is drawn to bisect a shortest distance disposed between a symmetrical axis of the electrode terminal and one short side of the cap plate and to be parallel to shorter sides of the cap plate, the safety vent having the track shape is disposed between the one short side of the cap plate and the virtual center line.

11. A secondary battery, comprising:

an electrode assembly performing charging and discharging functions;

a can housing the electrode assembly;

a cap assembly which includes a cap plate closing an open side of the can, and the cap plate having a pair of shorter sides disposed opposite to each other and a pair of longer sides disposed opposite to each other; and a safety vent having an indented periphery recessed into the cap plate, the indented periphery comprising first and second arc portions, and spaced-apart coupling portions asymmetrically positioned relative to a center line traversing the longer sides of the cap plate, the coupling portions joining together the first arc portion and the second arc portion disposed to face the first arc portion, said second arc portion having a smaller curvature compared to that of the first arc portion, an entirety of an inner portion defined by the indented periphery of the safety vent being configured to be flat.

12. The secondary battery as claimed in claim 11, with the first arc portion, the second arc and the coupling portions of the safety vent being formed in a notched shape.

13. The secondary battery as claimed in claim 11, with the safety vent being formed in a thinner thickness than that of portions of the cap plate where the safety vent is not formed.

14. The secondary battery as claimed in claim 11, with the first arc portion, the second arc and the coupling portions of the safety vent becoming separated from the secondary battery when the internal pressure of a battery increases excessively or an external impact is applied to the secondary battery.

15. The secondary battery as claimed in claim 1, with the second arc having a smaller length in comparison with that of the first arc.

16. The secondary battery as claimed in claim 11, with the second arc having a smaller length in comparison with that of the first arc.

* * * * *